3,467,313
HEATED HUMIDIFYING APPARATUS
Carl R. Pepmeier, Fredericksburg, Va., assignor to FMC Corporation, Philadelphia, Pa., a corporation of Delaware
Filed May 10, 1967, Ser. No. 637,519
Int. Cl. B05b 1/04, 1/24; C09j 5/02
U.S. Cl. 239—134                                   2 Claims

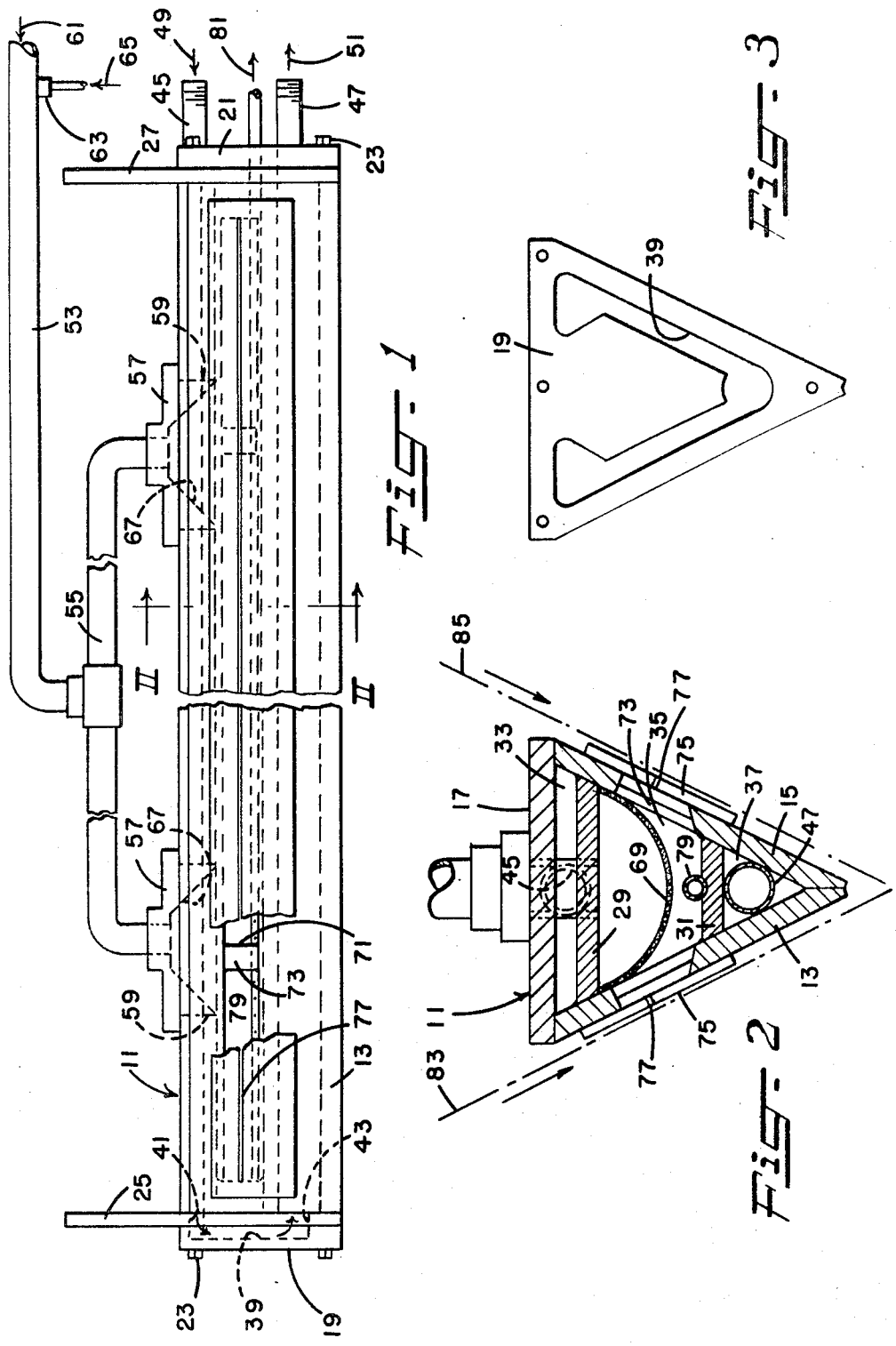

ABSTRACT OF THE DISCLOSURE

A heated steam chest for concomitantly heating and impinging moist steam against a traveling sheet material for humidifying the same, such chest being maintained at a desired elevated temperature by a heated fluid, separate from such steam, circulated therethrough.

---

This invention relates to an improved humidifying apparatus, and more particularly to a heated steam chest for heating and humidifying a sheet material as it is advanced relative thereto.

United States patent application of John D. Conti, Ser. No. 498,201, now United States Patent 3,322,593 describes a method and apparatus in which hydrophilic sheet materials, having a coating of thermoplastic material on at least one of the opposing sides thereof, are heated to soften such coating and are concomitantly humidified by moist steam immediately prior to being pressed together to provide a composite product. Heating of the sheet materials, as well as humidification thereof, is achieved by an electrically heated shoe from which moist steam is discharged and impinged against the sheet materials as they are being advanced along separate paths.

Basically, the heated shoe employed in the above-noted method includes a hollow triangular-shaped chamber into which moist steam is delivered and from which it is discharged through one or more openings. A series of electrical heaters are embedded in the walls of such chamber for maintaining the same at a desired elevated temperature. While such electrically heated shoes are capable of providing the necessary effects, the use of electrical heaters, and their required controls, wires, panels, etc., not only make such shoes expensive to construct and maintain, but are cumbersome during use in view of the many elements which project therefrom. Additionally, electrical heaters do not provide for as uniform a heat distribution along the entire length of the shoe as is desired, require long periods for heating and cooling, and when improperly controlled may cause damage to the sheet materials which are being laminated as well as to the shoe itself. Accordingly, a primary object of this invention is to provide a generally new or improved and more satisfactory heated steam chest for heating and humidifying traveling sheet materials.

Another object of this invention is the provision of an improved steam humidifying apparatus which is capable of being rapidly and uniformly heated by means of a heated fluid circulated therethrough.

Still another object of this invention is to provide a steam chest which is capable of discharging a more uniformly heated steam spray onto traveling sheet materials.

A further object is the provision of an apparatus for heating and humidifying advancing sheet materials which is simple and economical in construction and use, capable of accurate control, and has no elements which project into or along the paths of the sheet materials which are being treated.

These objects are accomplished in accordance with the present invention by an apparatus, and particularly a heated steam chest, which includes an elongated hollow body, having side walls and end plates, from which moist steam is discharged against sheet materials traveling relative thereto, and which is heated by a circulating heated fluid separate from such steam. More specifically, the elongated hollow body of the apparatus of the present invention is divided into three longitudinally extending chambers by a pair of spaced-apart partitions. The outermost of such chambers are connected to each other at one end of the hollow body so that a heated fluid, which is introduced into one of such outermost chambers, may be circulated through the body and, then be exhausted from the other of such outermost chambers. Into the remaining of such chambers, moist steam is delivered under pressure and is discharged therefrom through one or more openings formed in the body side walls.

With this arrangement, heating of the steam chest at the start of operations and cooling of each chest after operations are completed can be achieved very rapidly. More important, the circulating heated fluid serves to maintain the steam chest at substantially the same temperature along its entire length so that all portions of the sheet materials which are advanced relative to the chest are heated to the same degree.

The particular heated fluid employed and the degree to which such fluid is heated can be varied to suit desired operating conditions. Steam under a pressure of from 60 to 80 pounds per square inch and at temperature of at least 212° F. and desirably from 300° to 320° F. has been found to be satisfactory and is preferred over other mediums for reasons of economy and ease of handling.

The flow of the circulating heated fluid is separated from but surrounds the chamber into which the moist steam is delivered and, in view of its high temperature, efficient and uniform heating, no condensation of the moist steam within the chest itself is experienced during actual operations. Condensation of moist steam may occur when the steam chest is permitted to cool after use and thus it is preferred that the middle chamber be equipped to remove such excess steam and any condensate which may form.

The moist steam is delivered under a pressure which may be varied, of course, to suit particular operating requirements. Such moist steam is intended to humidify the hydrophilic materials which are advanced relative to the steam chest and is thus at a temperature of at least 212° F. and, contains sufficient moisture to achieve the desired degree of humidification under the particular operating conditions employed.

The heated steam chest of the present invention can be employed in various methods and with different hydrophilic sheet materials. It is especially useful in the method described in the above-noted patent of John D. Conti for concomitantly heating and humidifying sheet materials immediately prior to their lamination into a composite product and is hereafter described as adapted for use in such application. While the configuration of the steam chest may be varied without departing from the inventive teachings, a steam chest having a triangular cross-section is preferred in the above-noted laminating method since it permits the sheet materials to travel along converging paths while being heated and humidified and then into overlapped relationship immediately after moving beyond the steam chest.

In the drawings, FIGURE 1, is a shortened side view of the apparatus of the present invention, with a portion thereof being broken away;

FIGURE 2 is a transverse vertical section taken along the line II—II of FIGURE 1; and FIGURE 3 is a side view of an end plate of the apparatus shown in FIGURE 1.

With reference to the drawing for a more detailed description, the heated steam chest of the present invention includes an elongated, triangular-shaped hollow body, indicated generally by the character 11, having side walls 13, 15, and 17 and end plates 19 and 21.

The portion of the hollow body defined by the side walls may be formed by extrusion or, as illustrated, by separate plates welded to each other to provide a rigid and fluid-tight structure. The end plates 19 and 21 are bolted at 23 to the body side walls, together with support arms 25 and 27 by which the steam chest may be suspended in a desired position.

Partitions 29 and 31 are fixed, as by welding, within the hollow body in spaced-apart relationship and serve to divide the same into three longitudinally extending chambers 33, 15, and 37. The inner face of the end plate 19 is channeled at 39 and, together with aligned openings 41 and 43 in the adjacent support arm 25, provide a continuous, confined passage between the outermost chambers 33 and 37.

Pipes 45 and 47 extend through aligned openings in the end plate 21 and the adjacent support arm 27 and, as indicated by arrows 49 and 51, are adapted to be connected to fluid supply and exhaust means, respectively. The pipe 45 opens into the chamber 33, while the pipe 47 extends along the entire length of the chamber 37 and abuts snugly against the inner face of the end plate 19 and in alignment with its channeled portion 39. During the preparation and use of the steam chest a heated fluid, such as high pressure steam, is delivered continuously through the pipe 45, flows through the chamber 33 and channeled portion 39 of the end plate 19, and is exhausted through the pipe 47 after having traveled substantially the entire length of the hollow body. This exhausted fluid is preferably re-heated to a desired temperature by a suitable means, not shown, and is returned to the steam chest through the pipe 45. This continuous flow of heated fluid serves to rapidly heat and maintain the steam chest at a desired elevated temperature with no significant temperature variations along the length of the hollow body being experienced.

Into the remaining chamber 35, moist steam is delivered by a pipe 53, manifold 55 and sleeves 57, the latter of which extend through the chamber 33 and are aligned with openings 59 formed in the partition 29. The pipe 53 is adapted to be connected to a suitable source of moist steam under pressure, as indicated by the arrow 61, and may be provided with an aspirator or metering pump 63 for introducing into the moist steam various additives, such as softeners, dyes, etc., as indicated by the arrow 65. The use of a manifold 55 and sleeves 57 having diverging inlets, as shown at 67, facilitates distribution of the moist steam along the length of the chamber 35. To further assist in minimizing pressure differentials within the chamber 35, an arcuate screen or wire-mesh baffle 69 is fixed within the chamber 35 in position to be impinged by such moist steam as it enters therein.

Portions of the perforated side walls 13 and 15 which are adjacent to the chamber 35 are provided with openings 71 which are separated by ribs 73 and covered by plates 75. A continuous, uniform slot 77 is formed in each of the plates 75 for discharging the moist steam from within the chamber 35. The ribs 73 insure that the hollow body maintains its integrity under the pressures which are encountered and, as shown in FIGURE 2, are of reduced thickness so as to avoid obstructing any portions of the plate slots 77.

The high pressure steam which is circulated through the steam chest, as heretofore described, is generally at a higher temperature than the moist steam and thus there is generally no tendency for such moist steam to condense within the chamber 35 during actual operation. However, during a shut down and cooling of a steam chest, any moist steam remaining in the chamber 35 would normally condense and collect within such chamber. Accordingly, in the preferred form of the apparatus illustrated, a perforated conduit 79 extends along the entire length of the chamber 35 and through openings in the body end plate 21 and the adjacent supporting arm 27 for removing excess steam and any condensate therefrom, as indicated by the arrow 81.

In use, as in the method as described in the above-noted patent of John D. Conti, sheet materials 83 and are advanced relative to and in spaced relationship with heated steam chest of the present invention and heated by the fluid circulated therethrough and concomitantly humidified by the steam spray issuing from the slots 77. In addition to heating the sheet materials, the circulating heating fluid prevents condensation of the moist steam within the steam chest itself. After operations are completed, any excess steam within the chamber 35 is removed through the conduit 79 along with any condensate which may have formed therein and thus there is no risk of droplets of water being sprayed from the chest once the apparatus is again put into operation.

I claim:

1. In an apparatus for making a composite product by bonding together a pair of hydrophilic sheet materials having a coating of thermoplastic material on at least one of opposing sides thereof, a steam chest for heating and humidifying the sheet materials as they are advanced relative thereto along converging paths, said steam chest including three elongated side walls connected together to provide said steam chest with a triangular cross-section, plates extending across the ends of said side walls and together therewith defining an elongated hollow body, a pair of spaced partitions disposed within said hollow body in substantially parallel relationship with one of said side walls, said partitions extending between and connected to the other of said side walls to thereby divide said hollow body into a central and two outer chambers, a sleeve extending through said one of said side walls at a location between the ends thereof and through the outer chamber adjacent thereto for delivering moist steam under pressure into said central chamber, means defining an elongated slot in each of said other side walls opening into said central chamber for discharging moist steam therefrom and against sheet materials as they are advanced along converging paths generally parallel and relative to said other side walls to thereby humidify the sheet materials, a conduit extending through one of said plates for removing excess steam from within said central chamber, means cooperating with said other plate providing a passage between the two outer chambers and which is closed to the central of said chambers, means including pipes extending through said one plate for circulating a fluid having a temperature greater than the moist steam into said one outer chamber, through said passage, and out from thhe other of said outer chambers to maintain said side walls at an elevated temperature and thereby heat and soften the coating of thermoplastic material on the sheet material as they are advanced along their converging paths and relative to said steam chest.

2. In an apparatus as defined in claim 1 wherein the inlet of said sleeve diverges in the direction of the length of said steam chest to thereby distribute the moist steam along the length of said central chamber as it is delivered therein, and further including a porous baffle within said central chamber, said baffle positioned between said sleeve and said elongated slots and extending between said other side walls for minimizing differences in pressure in the moist steam as it moves toward said slots.

References Cited

UNITED STATES PATENTS

| | | | |
|---|---|---|---|
| 2,613,603 | 10/1952 | Ireton | 34—160 X |
| 2,949,239 | 8/1960 | Goyette | 239—597 X |
| 3,119,404 | 1/1964 | Lawrence | 239—310 X |
| 3,322,593 | 5/1967 | Conti | 156—307 |
| 3,343,799 | 9/1967 | Geitz | 239—568 |
| 3,386,659 | 6/1968 | Rea | 239—132 |

M. HENSON WOOD, JR., Primary Examiner

B. BELKIN, Assistant Examiner

U.S. Cl. X.R.

156—307, 497; 239—568

PO-1050
(5/69)

UNITED STATES PATENT OFFICE
CERTIFICATE OF CORRECTION

Patent No. 3,467,313     Dated September 16, 1969

Inventor(s) Carl R. Pepmeier

It is certified that error appears in the above-identified patent and that said Letters Patent are hereby corrected as shown below:

Col. 3, line 27, "15" should read --35--. Col. 4, line 63, "thhe" should read --the--.

SIGNED AND
SEALED

DEC 23 1969

(SEAL)
Attest:

Edward M. Fletcher, Jr.
Attesting Officer

WILLIAM E. SCHUYLER, JR
Commissioner of Patents